J. B. STEARNS.
Telegraph Apparatus.
No. 78,547.
Patented June 2, 1868
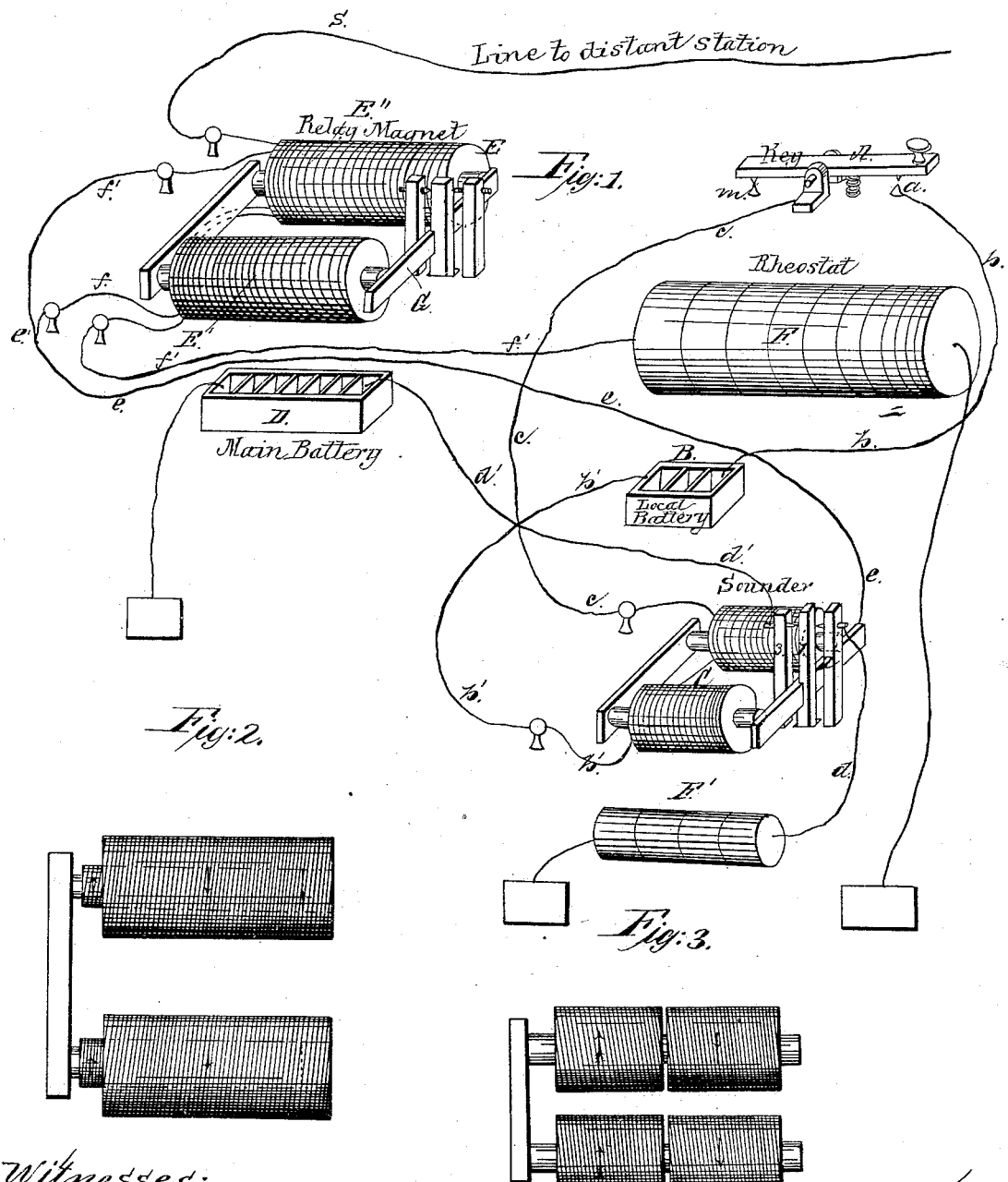

UNITED STATES PATENT OFFICE.

JOSEPH B. STEARNS, OF BOSTON, MASSACHUSETTS.

IMPROVEMENT IN TELEGRAPH APPARATUS.

Specification forming part of Letters Patent No. 78,547, dated June 2, 1868.

*To all whom it may concern:*

Be it known that I, JOSEPH B. STEARNS, of Boston, in the county of Suffolk and State of Massachusetts, have invented a new and useful Improvement in Telegraphic Apparatus, of which the following is a full, clear, and exact description, reference being had to the accompanying drawings, making a part of this specification, and representing the various parts of a telegraphic apparatus for carrying out my invention.

Figure 1 represents a general view of the apparatus. Figs. 2 and 3 are modifications of the relay-magnet.

The object of my invention is to provide an efficient means for transmitting messages simultaneously over a single wire in opposite directions; and the invention consists in so constructing and arranging the keys or other circuit-breakers and the electro-magnets that the current from the battery of what may be termed the "home station" will be divided, so as to pass around the cores of the electro-magnet in opposite directions, one portion passing over the line to the distant station, and the other portion passing through a rheostat or other resistance to the ground, the one portion thus neutralizing the effect of the other portion, and producing no magnetism in the cores or effect upon the armature; while at the same time a current from the distant battery can pass through one half of the wire, or one set of wires on each helix, to the key or circuit-breaker, and thence through the battery to the ground, if the circuit-breaker is in contact with the front stop, or through a rheostat to the ground if in contact with the back stop, or through all the wire on each helix and a larger rheostat to the ground if between the two stops and in contact with neither, the magnetism produced in the cores in each of the three positions of the circuit-breakers, as above mentioned, being practically constant.

In practice, I prefer to make the key or circuit-breaker in the form of a common sounder, the lever of which corresponds to the lever of a common key, and, being furnished with an armature, may be manipulated by means of an electro-magnet, local battery, and common key, as shown in the drawing.

Referring to the drawings, A represents a key of the ordinary construction, and with which the sending-operator works. From the point *a*, or front stop of said key, the wire *b* passes to one pole of the local battery B, from the other pole of which the wire *b'* passes to and around the electro-magnet of the sounder C, and thence to the key A.

From the rear stop 2 of the sounder, which in this description may be considered as the key for the main battery and line, a wire, *d*, passes to and through the rheostat F', which is so adjusted that its resistance is equal, or about equal, to that of the main battery D, and thence to the ground.

From the sounder-lever or main-line key 1, when in contact with the front stop 3, the current from battery D passes through a wire, *e*, to the relay or electro-magnet E, near which, at a point, *e'*, it is divided, one portion passing by wire *f* through half the wire on each helix in one direction to the line *s*, leading to the distant station. The other portion passes, by the wire *f'*, through the other half of the wire on each helix in the opposite direction, and thence to and through the rheostat F to the ground.

The object of the rheostat F is to furnish, by its proper adjustment, the same, or nearly the same, resistance as is offered to or experienced by the current from battery D in passing over the line to the distant station, and through the apparatus there to the ground.

The object of the rheostat F' is to furnish, by its proper adjustment, the same, or nearly the same, resistance to the current of the battery at the distant station, when the key 1 at the home station is in contact with the back stop 2, that it meets with in passing through the battery D when the key 1 is in contact with the front stop 3. This adjustment of resistance is necessary to prevent the destruction of the neutralization of the electro-magnet at the distant station when the key at the home station is in different positions and the rheostat F is not employed. It is obvious that if the rheostat F at the distant station is adjusted while the key 1 at the home station is in contact with the front stop 3, it will contain the same resistance as the line, instruments, and battery D. If, now, the resistance of battery D is removed, and the line put on "short circuit" to the ground, the resistance met with by the current of the battery at the distant station is greatly reduced, while the resistance of the rheostat F at that station remains unchanged, in consequence of which the neutralization of the electro-magnet at the distant station is destroyed, and the sending-operator at that station hears his own writing on the relay there, and the writing from the home station is thus interfered with and confused.

The wire $d$, rheostat F', and ground connected with back stop 2 may be, in some cases, entirely-dispensed with, the current from the distant station having at all times a passage to the ground, either through battery D or rheostat F; but in most cases I prefer to use them.

The operation is as follows: The key A being depressed and brought in contact with point $a$, a current is established through wire $b$, battery B, wire $b'$, electro-magnet of sounder C, wire $c$, and key A, thus completing the circuit, and attracting the armature and lever 1 or main-line key. As soon as the lever 1 comes in contact with the front stop 3, to which the wire $d'$, leading to the main battery D, is attached, the current from battery D passes by wire $e$, connected with lever 1, to the point $e'$, where it is divided, one portion passing around the helices E' E'' of the relay E to the line $s$, leading to the distant station, the other portion also passing around the helices E' E'', but in an opposite direction to and through the rheostat F, which offers a resistance equal to, or as nearly so as is possible, that of the line to the distant station and the apparatus there, and thence to the ground. Thus the currents passing through the two channels are equalized, and the magnetism of the cores is neutralized, or, more strictly speaking, prevented, and the armature is unaffected. At the same time, however, a current from the battery of the distant station may pass over the line $s$ through one-half the wire on each helix, by wire $f$, to the point $e'$, where it separates, one portion passing, by wire $f'$, through the other half of the wire on each helix, and in the same direction as before; thence, by wire $f''$, to and through the rheostat F to the ground, the other portion passing directly to the lever 1; thence through the battery D to the ground if the lever 1 is in contact with the front stop 3, or through the rheostat F' to the ground if lever 1 is in contact with the back stop 2. In case the lever 1 is between the stops 2 and 3, and in contact with neither, then the current from the distant station passes through all the wire on each helix, and through rheostat F to the ground. In either of the cases mentioned above, the current from the battery at the distant station magnetizes the cores of the relay at the home station, and the armature G is consequently attracted. It is also obvious that the armature-post of the relay E may be made to close another local circuit, and thus operates another sounder for the accommodation of the receiving-operator at the home station. It is also obvious that the sounder C may be dispensed with, the key A being made to act as the main-line key, it taking the place of lever 1, and the front stop $a$ taking the place of the front stop 3, and the back stop $m$ taking the place of the back stop 2; but in practice the former method is preferred.

The coils of the electro-magnets E are constructed by winding the wires side by side throughout their whole length, so that the number of turns and length of each wire of which the helices are formed shall be equal.

As a modification of the method described of winding the wires over which the opposing currents pass side by side through their whole course to form the helices, the wire for one current may be wound in one direction, forming a cylinder of any number of turns of wire, and the wire for the other current may be wound in the opposite direction, forming a cylinder outside of and containing an equal number of turns of wire as the first cylinder; or the two concentric cylinders may be wound in the same direction and connected, so as to pass the current through them in opposite directions, the magnetism produced by the passage of the current through the inner cylinder being thus neutralized by that of the current passing through the outer cylinder. This modification is shown in Fig. 2.

Another modification consists in making each helix in two or more separate sections, as shown in Fig. 3, which sections may be so wound or so connected as to allow the current to pass through one half in one direction, and through the other half in the opposite direction, the magnetic effect produced by one half being neutralized by the other.

Either of the methods above described of forming the helices produces a more uniform and absolute neutralization than the method adopted by Frischen and Siemens, of passing the current through the whole helix in one direction and through the other helix in the opposite direction. The defect in this method is the tendency of the cores to become separate magnets, and not to completely neutralize each other, and the consequent action upon the armature by the polarity of the cores, and also by the helices themselves, which, acting separately, tend to produce polarity in the armature.

The method of Frischen and Siemens, which my method more nearly resembles than any other, has two great defects, which, when taken in connection with each other and with the varying conditions of a telegraph-line, conspire to render it practically useless. One of these defects is in the construction of the electro-magnet, as already pointed out, and the other consists in the great variation in resistance which each battery meets with in the different positions of the key at the other station, and the consequences of this variation, as already pointed out when describing the rheostat F' and its stat F' and its use. These defects I have sought to remedy in order to produce a practical and useful instrument.

I am aware that it is not new to make an electro-magnet with two sets of wires, through which a current or currents may be passed in opposite directions, for the purpose of neutralizing the magnetism in the cores; neither is it new to make a key or circuit-breaker that will, when in one position, connect the line with the battery, and, in another position, with the ground. But I believe it to be new to construct the helices of an electro-magnet in the manner first described, by winding the wires side by side throughout their whole length. I also believe it to be new to construct the helices as in the second modification described, by winding them in two or more separate sections on each core. I also believe it to be new to employ a rheostat or other resistance in the wire connecting the back stop of the key or circuit-breaker with the ground, for the purpose described. I also believe it to be new to combine an electro-magnet constructed according to either of the methods above described, or as used by Frischen and Siemens, with a key or circuit-breaker having a rheostat or other resistance in the wire connecting its back stop with the ground, or with a key or circuit-breaker having no connection between its back stop and the ground. I also believe it to be new to move or manipulate the key or circuit-breaker constructed and connected as described by an electro-magnet and local battery, as shown in the drawing, to the end that the sending operators may hear their own writing, and thus the better guard against mistakes; to combine the key as so constructed and manipulated with the electro-magnet and other apparatus herein described as forming parts of this invention.

I therefore claim as my invention, and desire to secure by Letters Patent—

1. In an electro-magnet coil constructed of two opposing or neutralizing conductors, making each of the conductors of the same length, and giving them each an equal number of turns, as and for the purpose set forth.

2. A key or other circuit-breaker, the back stop of which is connected with the ground by a wire, in which is placed a rheostat or other resistance, and for the purpose set forth.

3. Combining an electro-magnet constructed as described, or in any other manner, to produce either complete or partial neutralization of its cores, with a key or circuit-breaker having a connection between the back stop or its equivalent and the ground, through a rheostat or other resistance, and for the purpose described.

4. Combining an electro magnet constructed as described, or in any other manner by which either a complete or partial neutralization of its cores is produced, with a key or circuit-breaker having no connection between its back stop and the ground, as specified.

5. In combination with an electro-magnet constructed substantially as described, the key A, the key or circuit-breaker C, local battery B, and rheostat F, all constructed and operating substantially as and for the purpose set forth.

In testimony whereof I have signed my name to this specification in the presence of two subscribing witnesses.

JOSEPH B. STEARNS.

Witnesses:
J. H. ADAMS,
E. L. DYER.